US012480760B2

(12) United States Patent
Takahashi et al.

(10) Patent No.: US 12,480,760 B2
(45) Date of Patent: Nov. 25, 2025

(54) ANGLE WIDTH ESTIMATION DEVICE, ANGLE WIDTH ESTIMATION METHOD, AND TARGET ANGLE MEASUREMENT DEVICE

(71) Applicant: Mitsubishi Electric Corporation, Tokyo (JP)

(72) Inventors: Yoshiki Takahashi, Tokyo (JP); Ryuhei Takahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 144 days.

(21) Appl. No.: 18/207,235

(22) Filed: Jun. 8, 2023

(65) Prior Publication Data

US 2023/0314127 A1    Oct. 5, 2023

Related U.S. Application Data

(63) Continuation of application No. PCT/JP2021/007704, filed on Mar. 1, 2021.

(51) Int. Cl.
*G01B 11/26*    (2006.01)

(52) U.S. Cl.
CPC .................... *G01B 11/26* (2013.01)

(58) Field of Classification Search
CPC ...... G01B 11/26; H04B 17/27; H04B 17/318; H04B 7/086; G01S 3/02; G01S 3/043; G01S 3/46
USPC ........................................ 356/138
See application file for complete search history.

(56) References Cited

U.S. PATENT DOCUMENTS

| 2007/0047742 A1* | 3/2007 | Taenzer | H04R 29/006 381/92 |
| 2017/0338900 A1* | 11/2017 | Shimbo | H04B 1/06 |
| 2022/0200665 A1* | 6/2022 | Rom | H04B 7/086 |

FOREIGN PATENT DOCUMENTS

| JP | 3738705 B2 | 1/2006 |
| JP | 4784976 B2 | 10/2011 |

OTHER PUBLICATIONS

International Search Report (PCT/ISA/210), issued in PCT/JP2021/007704, dated Apr. 20, 2021.
Ogawa et al., "Angular Spread Estimation by Derivative Constrained Capon Estimator Using Integrated Mode Vector", IEICE, B—Abstracts of IEICE Transactions on Communications (Japanese Edition), 2009, vol. J92-B, No. 6, pp. 921-929.
Tsukagoshi et al., "A Sparse Signal Processing for Angular Estimation of Spread Wave Sources", IEICE, IEICE Technical Report, 2013, vol. 112, No. 391, pp. 67-71.

* cited by examiner

*Primary Examiner* — Sunghee Y Gray
(74) *Attorney, Agent, or Firm* — Birch, Stewart, Kolasch & Birch, LLP

(57) ABSTRACT

An angle width estimation device is configured in such a way as to include: a beam forming unit to acquire one reception array signal of a reflected wave from a target to be observed, and form, from the one reception array signal, a plurality of null beams having nulls in an arrival direction of the reflected wave, and having null widths which are widths of the nulls and different from each other; and an angle width estimating unit to compare powers of the plurality of null beams formed by the beam forming unit with each other, and estimate a null width indicating an angle width of the reflected wave on the basis of a comparison result of the powers.

5 Claims, 9 Drawing Sheets

ANGLE WIDTH ESTIMATION DEVICE, ANGLE WIDTH ESTIMATION METHOD, AND TARGET ANGLE MEASUREMENT DEVICE

CROSS REFERENCE TO RELATED APPLICATIONS

This application is a Continuation of PCT International Application No. PCT/JP2021/007704, filed on Mar. 1, 2021, which is hereby expressly incorporated by reference into the present application.

TECHNICAL FIELD

The present disclosure relates to an angle width estimation device, an angle width estimation method, and a target angle measurement device.

BACKGROUND ART

When a target to be observed is a distant target that can be regarded as a point wave source, a reflected wave from the target does not have an angle width. In contrast, when the target to be observed is an adjacent target that cannot be regarded as the point wave source, the reflected wave from the target has the angle width.

When an angle measurement device that measures an angle of the adjacent target does not measure the angle of the target using the angle width of the reflected wave from the target, accuracy of measuring the angle of the target is deteriorated.

Non-Patent Literature 1 discloses an angle width estimating technology of estimating an angle width of a reflected wave from an adjacent target.

In the angle width estimating technology, a computer estimates the angle width of the reflected wave by executing the Capon method. The Capon method is a method of estimating the angle width that can be executed when a plurality of reception array signals at different sampling times is acquired by an array antenna.

CITATION LIST

Non-Patent Literature

Non-Patent Literature 1: Ogawa, Kikuma et al., "Angular Spread Estimation by Derivative Constrained Capon Estimator Using Integrated Mode Vector", Journal of The Institute of Electronics, Information and Communication Engineers, Vol. J92-B, No. 6, June 2009.

SUMMARY OF INVENTION

Technical Problem

In the angle width estimating technology disclosed in Non-Patent Literature 1, the computer cannot execute the Capon method unless a plurality of reception array signals is acquired. For this reason, there is a problem that the computer cannot estimate the angle width of the reflected wave unless a plurality of reception array signals is acquired.

The present disclosure has been achieved to solve the above-described problem, and an object thereof is to acquire an angle width estimation device and an angle width estimation method capable of estimating an angle width of a reflected wave from a target from one reception array signal.

Solution to Problem

An angle width estimation device according to the present disclosure includes: beam forming circuitry to acquire one reception array signal of a reflected wave from a target to be observed, and form, from the one reception array signal, a plurality of null beams having nulls in an arrival direction of the reflected wave, and having null widths which are widths of the nulls and different from each other; and angle width estimating circuitry to compare powers of the plurality of null beams formed by the beam forming circuitry with each other, and estimate a null width indicating an angle width of the reflected wave on the basis of a comparison result of the powers.

Advantageous Effects of Invention

According to the present disclosure, an angle width of a reflected wave from a target can be estimated from one reception array signal.

BRIEF DESCRIPTION OF DRAWINGS

FIG. 3 is a hardware configuration diagram of a computer when the angle width estimation device 4 is implemented by software, firmware or the like.

DESCRIPTION OF EMBODIMENTS

A mode for carrying out the present disclosure is hereinafter described with reference to the attached drawings in order to describe the present disclosure in further detail.

First Embodiment

Figure 1:
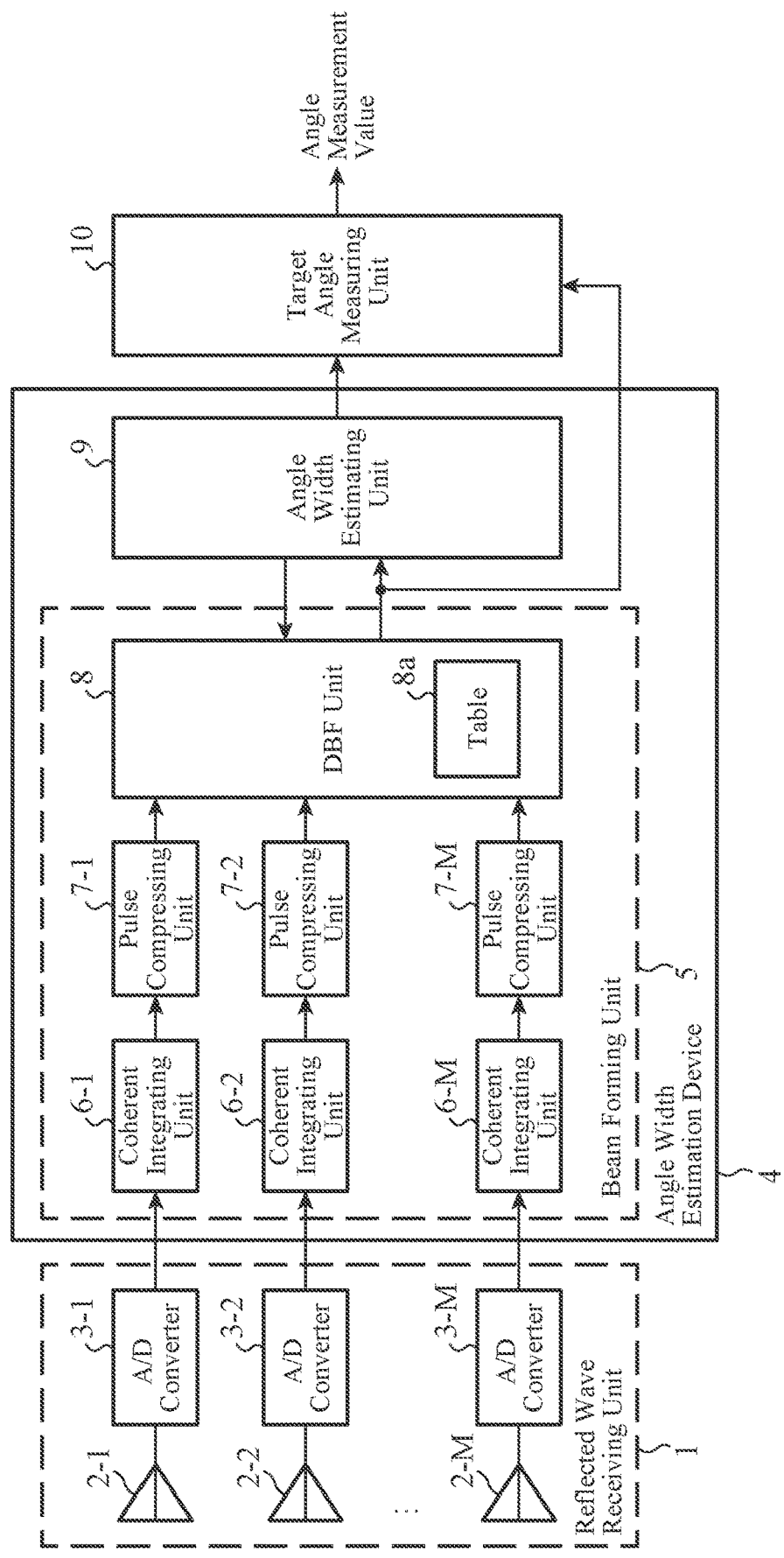
FIG. 1 is a configuration diagram illustrating a target angle measurement device including an angle width estimation device 4 according to a first embodiment.

FIG. 1 is a configuration diagram illustrating a target angle measurement device including an angle width estimation device 4 according to a first embodiment.

Figure 2:
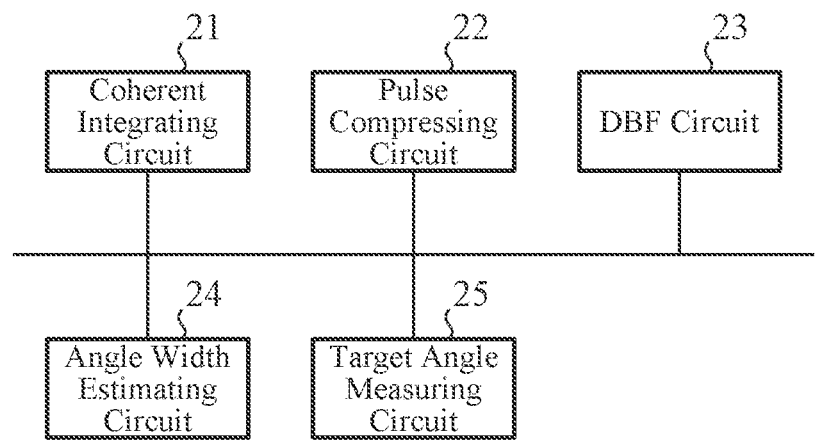
FIG. 2 is a hardware configuration diagram illustrating hardware of a digital signal processing unit in the target angle measurement device illustrated in FIG. 1.

FIG. 2 is a hardware configuration diagram illustrating hardware of a digital signal processing unit in the target angle measurement device illustrated in FIG. 1.

The target angle measurement device illustrated in FIG. 1 is provided with a reflected wave receiving unit 1, the angle width estimation device 4, and a target angle measuring unit 10.

The reflected wave receiving unit 1 is provided with reception antenna elements 2-1 to 2-M and analog-to-digital converters (hereinafter referred to as "A/D converters") 3-1 to 3-M. M is an integer equal to or larger than two.

The reflected wave receiving unit 1 receives a reflected wave from a target to be observed, and outputs a reception array signal $r_{ARE}$ of the reflected wave to the angle width estimation device 4. The reception array signal $r_{ARE}$ of the reflected wave is a signal including a plurality of reception signals $r_1$ to $r_M$ output from the reception antenna elements 2-1 to 2-M, respectively.

The target angle measurement device illustrated in FIG. 1 is not provided with a radio wave transmitting unit that emits a radio wave toward the target to be observed. Therefore, in the target angle measurement device illustrated in FIG. 1, it is supposed that an external radio wave transmitting unit not illustrated emits the radio wave toward the target to be observed. However, this is merely an example, and the target angle measurement device illustrated in FIG. 1 may be provided with the radio wave transmitting unit.

The reception antenna elements 2-1 to 2-M form a reception array antenna.

The reception antenna element 2-$m$ ($m$=1, . . . , M) receives the reflected wave from the target to be observed, and outputs the reception signal $r_m$ included in the reception array signal $r_{ARE}$ of the reflected wave to the A/D converter 3-$m$.

The A/D converter 3-$m$ converts the reception signal $r_m$ output from the reception antenna element 2-$m$ from an analog signal to a digital signal.

The A/D converter 3-$m$ outputs the digital signal to the angle width estimation device 4, as the reception signal included in the reception array signal $r_{ARE}$.

In the target angle measurement device illustrated in FIG. 1, a receiver that detects the reception signal $r_m$ output from the reception antenna element 2-$m$ is not illustrated. For example, a receiver may be mounted between the reception antenna element 2-$m$ and the A/D converter 3-$m$, or the receiver may be included in the A/D converter 3-$m$.

In the target angle measurement device illustrated in FIG. 1, the reflected wave receiving unit 1 is provided with the reception array antenna including the reception antenna elements 2-1 to 2-M. However, this is merely an example, and the reflected wave receiving unit 1 may be provided with an array microphone including a plurality of microphones or an array sensor including a plurality of radio wave sensors, in place of the reception array antenna. When the reflected wave receiving unit 1 is provided with the array microphone, the reflected wave is a sound wave. When the reflected wave receiving unit 1 is provided with the array sensor, the reflected wave is a radio wave.

The angle width estimation device 4 is provided with a beam forming unit 5 and an angle width estimating unit 9.

The angle width estimation device 4 estimates an angle width of the reflected wave, by performing signal processing on the reception array signal $r_{ARE}$ output from the reflected wave receiving unit 1.

The beam forming unit 5 is provided with coherent integrating units 6-1 to 6-M, pulse compressing units 7-1 to 7-M, and a digital beam forming (DBF) unit 8.

The beam forming unit 5 acquires one reception array signal $r_{ARE}$ output from the reflected wave receiving unit 1, and forms, from the one reception array signal $r_{ARE}$, a plurality of null beams having nulls in an arrival direction of the reflected wave, and having null widths which are widths of the nulls and different from each other.

In the target angle measurement device illustrated in FIG. 1, for example, since a schematic position of the target to be observed is detected in advance, the beam forming unit 5 can form the null beam in the arrival direction of the reflected wave.

The coherent integrating unit 6-$m$ ($m$=1, . . . , M) is implemented by, for example, a coherent integrating circuit 21 illustrated in FIG. 2.

The coherent integrating unit 6-$m$ performs coherent integration on the digital signal output from the A/D converter 3-$m$, by performing, for example, fast Fourier transform (FFT) in a time direction, and outputs the signal after the coherent integration to the pulse compressing unit 7-$m$.

The pulse compressing unit 7-$m$ ($m$=1, . . . , M) is implemented by, for example, a pulse compressing circuit 22 illustrated in FIG. 2.

The pulse compressing unit 7-$m$ performs pulse compression on the signal after the coherent integration output from the coherent integrating unit 6-$m$, and outputs the signal after the pulse compression to the DBF unit 8.

The DBF unit 8 is implemented by a DBF circuit 23 illustrated in FIG. 2, for example.

The DBF unit 8 is provided with a table 8a.

The table 8a stores a plurality of weights regarding the null beam formed by the DBF unit 8. Because of the different weights, one or more of a beam forming direction, a null forming direction, and the null width of the null beam changes. Each weight includes M weight elements.

The DBF unit 8 acquires M signals after the pulse compression from the pulse compressing units 7-1 to 7-M.

The DBF unit 8 forms the null beam having the null in the arrival direction of the reflected wave, by performing digital beam forming on the M signals after the pulse compression output from the pulse compressing units 7-1 to 7-M.

After forming the null beams, when the DBF unit 8 acquires a null beam forming command from the angle width estimating unit 9, the DBF unit 8 performs the digital beam forming on the M signals after the pulse compression, thereby forming the null beam having the null with the null width wider than that of the null of the previously formed null beam.

That is, when acquiring the M signals after the pulse compression from the pulse compressing units 7-1 to 7-M, the DBF unit 8 acquires one weight from the table 8a.

The DBF unit 8 multiplies the signals after the pulse compression by the respective weight elements included in the acquired weight, and calculates the sum of a plurality of signals after the weight element multiplication, thereby forming the null beam having the null in the arrival direction of the reflected wave. The DBF unit 8 outputs the null beam to the angle width estimating unit 9.

After forming the null beam, when the DBF unit 8 acquires the null beam forming command from the angle width estimating unit 9, the DBF unit 8 acquires one weight different from the already acquired weight from the table 8a.

The DBF unit 8 multiplies the signals after the pulse compression by the respective weight elements included in the acquired weight, and calculates the sum of a plurality of signals after the weight element multiplication, thereby forming the null beam having the null with the null width wider than that of the null of the previously formed null beam. The DBF unit 8 outputs the null beam to the angle width estimating unit 9.

In the target angle measurement device illustrated in FIG. 1, the beam forming unit 5 is provided with the pulse compressing units 7-1 to 7-M. However, the beam forming unit 5 is not required to be provided with the pulse compressing units 7-1 to 7-M.

The angle width estimating unit 9 is implemented by an angle width estimating circuit 24 illustrated in FIG. 2, for example.

The angle width estimating unit 9 compares powers of the plurality of null beams formed by the beam forming unit 5 with each other, and estimates the null width indicating the angle width of the reflected wave on the basis of a comparison result of the powers.

That is, when acquiring one null beam from the DBF unit 8, the angle width estimating unit 9 repeatedly outputs the null beam forming command to the DBF unit 8, thereby acquiring a plurality of null beams from the DBF unit 8.

The angle width estimating unit 9 monitors a change in power of the null beam output from the DBF unit 8, and searches for, as the null width indicating the angle width, the null width of the null beam when the power stops decreasing from a state in which the power decreases.

The angle width estimating unit 9 outputs the angle width indicated by the estimated null width to the target angle measuring unit 10.

The target angle measuring unit 10 is implemented by a target angle measuring circuit 25 illustrated in FIG. 2, for example.

The target angle measuring unit 10 measures an angle of the target using the angle width output from the angle width estimating unit 9.

In FIG. 1, it is supposed that each of the coherent integrating units 6-1 to 6-M, the pulse compressing units 7-1 to 7-M, the DBF unit 8, and the angle width estimating unit 9, which are components of the angle width estimation device 4, is implemented by dedicated hardware as illustrated in FIG. 2. That is, it is supposed that the angle width estimation device 4 is implemented by the coherent integrating circuit 21, the pulse compressing circuit 22, the DBF circuit 23, and the angle width estimating circuit 24.

Each of the coherent integrating circuit 21, the pulse compressing circuit 22, the DBF circuit 23, and the angle width estimating circuit 24 corresponds to, for example, a single circuit, a composite circuit, a programmed processor, a parallel-programmed processor, an application specific integrated circuit (ASIC), a field-programmable gate array (FPGA), or a combination thereof.

The components of the angle width estimation device 4 are not limited to those implemented by the dedicated hardware, and the angle width estimation device 4 may also be implemented by software, firmware, or a combination of the software and firmware.

The software or firmware is stored, as a program, in a memory of a computer. The computer is intended to mean hardware that executes the program, and corresponds to, for example, a central processing unit (CPU), a central processing device, a processing device, an arithmetic device, a microprocessor, a microcomputer, a processor, or a digital signal processor (DSP).

Figure 3:
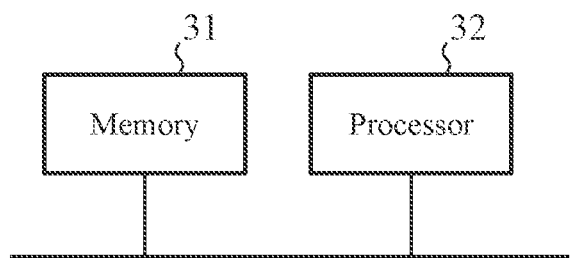

FIG. 3 is a hardware configuration diagram of the computer when the angle width estimation device 4 is implemented by the software, firmware or the like.

When the angle width estimation device 4 is implemented by the software, firmware or the like, a program for causing the computer to execute each processing procedure in the coherent integrating units 6-1 to 6-M, the pulse compressing units 7-1 to 7-M, the DBF unit 8, and the angle width estimating unit 9 is stored in a memory 31. Then, a processor 32 of the computer executes the program stored in the memory 31.

FIG. 2 illustrates an example in which each of the components of the angle width estimation device 4 is implemented by the dedicated hardware, and FIG. 3 illustrates an example in which the angle width estimation device 4 is implemented by the software, firmware or the like. However, these are merely examples, and some components in the angle width estimation device 4 may be implemented by the dedicated hardware, and the remaining components may be implemented by the software, firmware or the like.

Next, an operation of the target angle measurement device illustrated in FIG. 1 is described.

The reception antenna element 2-$m$ ($m=1, \ldots, M$) receives the reflected wave from the target to be observed, and outputs the reception signal $r_m$ of the reflected wave to the A/D converter 3-$m$.

When receiving the reception signal $r_m$ from the reception antenna element 2-$m$, the A/D converter 3-$m$ converts the reception signal $r_m$ from the analog signal to the digital signal and outputs the digital signal to the angle width estimation device 4.

The angle width estimation device 4 estimates the angle width of the reflected wave by performing signal processing on the digital signal output from the A/D converter 3-$m$.

Hereinafter, the signal processing by the angle width estimation device 4 is specifically described.

Figure 4:
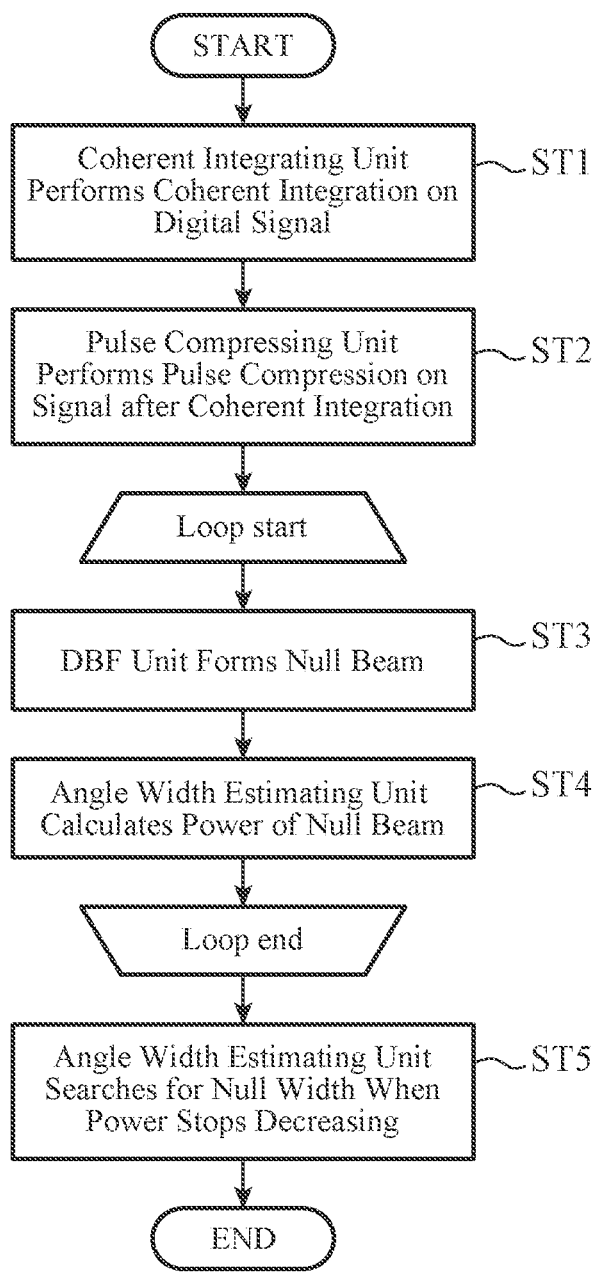
FIG. 4 is a flowchart illustrating an angle width estimation method being a processing procedure of the angle width estimation device 4 according to the first embodiment.

FIG. 4 is a flowchart illustrating an angle width estimation method being the processing procedure of the angle width estimation device 4 according to the first embodiment.

When only one reflected wave having no angle width is incident on the reception antenna element 2-$m$ ($m=1, \ldots, M$), a reception array signal $r_{ARE}(t)$ at time t in the reception array antenna with the number of channels M is expressed by the following Expression (1).

$$r_{ARE}(t)=a(\theta,\phi)s(t)+n(t) \quad (1)$$

In Expression (1), $a(\theta,\phi)$ represents a steering vector when an elevation angle is $\theta$ and an azimuth angle is $\phi$. Herein, s(t) represents a signal complex amplitude at time t, and n(t) represents a thermal noise vector at time t.

Figure 5:
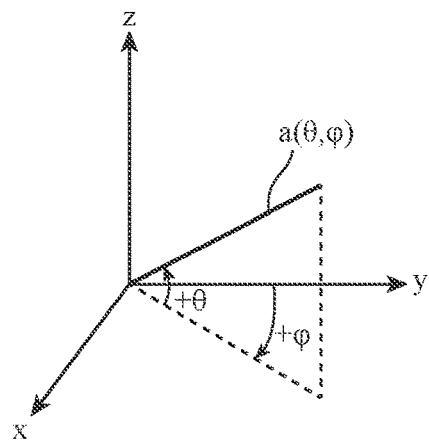
FIG. 5 is an explanatory diagram illustrating each of an elevation angle $\theta$ and an azimuth angle $\varphi$ in a steering vector $a(\theta,\varphi)$.

When each of the elevation angle $\theta$ and the azimuth angle $\phi$ is expressed by a coordinate system illustrated in FIG. 5, the steering vector $a(\theta,\phi)$ is expressed by the following Expression (2).

FIG. 5 is an explanatory diagram illustrating each of the elevation angle $\theta$ and the azimuth angle $\phi$ in the steering vector $a(\theta,\phi)$.

In the coordinate system illustrated in FIG. 5, the elevation angle θ is an angle formed by the steering vector a(θ,φ) with respect to an x-y plane, and when the steering vector a(θ,φ) is a direction parallel to the x-y plane, θ=0 [deg.] is satisfied.

The azimuth angle φ is an angle formed by the steering vector a(θ,φ) with respect to a direction parallel to a y-axis on the x-y plane, and when the steering vector a(θ,φ) is in the direction parallel to the y-axis, φ=0 [deg.] is satisfied.

$$a(\theta, \phi) = \exp\left(j\frac{2\pi}{\lambda}RL(\theta, \phi)\right) \quad (2)$$

$$R = \begin{bmatrix} x_1 & y_1 \\ \vdots & \vdots \\ x_M & y_M \end{bmatrix} \quad (3)$$

$$L(\theta, \phi) = [\cos\theta \sin\phi \sin\theta]^T \quad (4)$$

In Expressions (2) to (4), λ represents a wavelength, R represents an element coordinate matrix in the reception antenna elements 2-1 to 2-M, $x_m$ represents an x coordinate of a position at which an m-th reception antenna element 2-m is installed, and $y_m$ represents a y coordinate of the position at which the m-th reception antenna element 2-m is installed. L(θ,φ) represents a line-of-sight direction vector when the elevation angle is θ and the azimuth angle is φ.

Hereinafter, for the sake of simplicity, it is described using a steering vector a(u,v) in which u=cos θ sin φ and v=sin θ.

A weight w for forming the null beam having the null with respect to u,v is acquired by the following Expression (5) on the basis of a directionally constrained minimization of power (DCMP) method when beam forming directions $u_d$ and $v_d$ are determined.

$$w = \alpha R_{xx}^{-1} a(u_d, v_d) \quad (5)$$

In Expression (5), α represents any normalization coefficient, and $R_{xx}^{-1}$ represents an inverse matrix of a correlation matrix $R_{xx}$ of the reflected wave having the angle width.

Hereinafter, directions in which the null is formed are expressed as $u_c$ and $v_c$.

The null width of the null beam in which the null forming directions are $u_c$ and $v_c$ is defined by the correlation matrix $R_{xx}$ of the reflected wave having the angle width.

Figure 6:
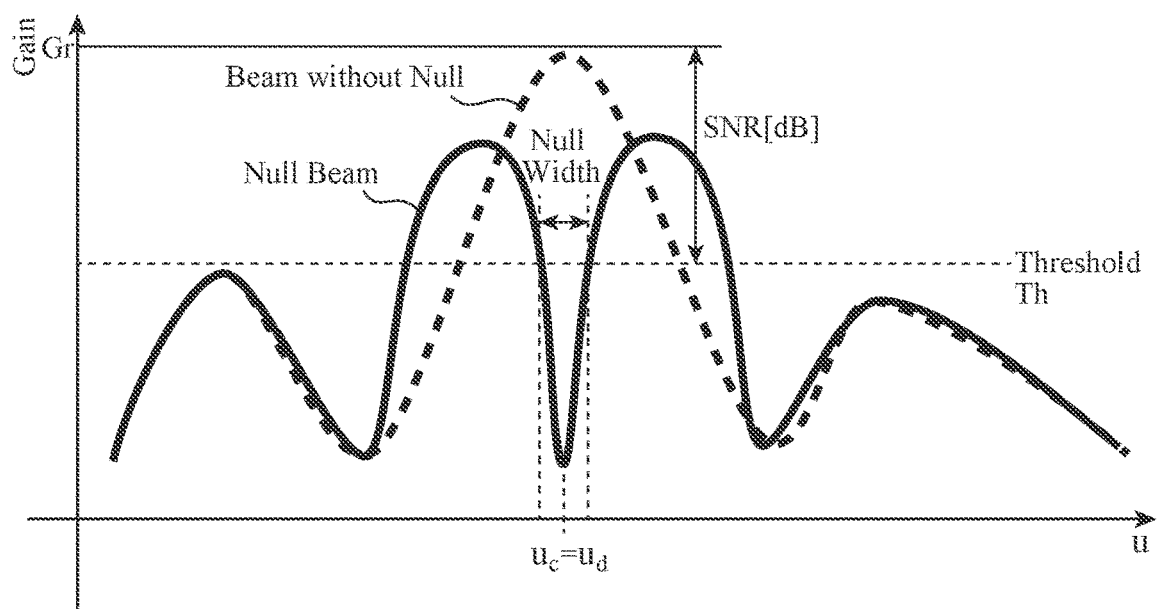
FIG. 6 is an explanatory diagram illustrating a null width in a beam forming direction $u_d$ in a null beam.

FIG. 6 is an explanatory diagram illustrating the null width in the beam forming direction $u_d$ in the null beam.

In the example in FIG. 6, the beam forming direction $u_d$ in a u-axis direction coincides with the null forming direction $u_c$ in the u-axis direction. Around the null forming direction $u_c$, the width in the u-axis direction of the null beam in which a gain of the null beam is equal to or smaller than a threshold Th coincides with the null width in the u-axis direction of the null beam. As the threshold Th, for example, a gain lower, by a signal to noise ratio (SNR), than a gain Gr of the beam having no null in the beam forming direction $u_d$ is used, as expressed by the following Expression (6). The SNR is calculated from receiver noise power and reception signal power in the receiver included in the reflected wave receiving unit 1.

$$Th = Gr - SNR \quad (6)$$

The null width in a v-axis direction in the null beam is handled similarly to the null width in the u-axis direction in the null beam.

That is, the beam forming direction $v_d$ in the v-axis direction coincides with the null forming direction $v_c$ in the v-axis direction. Around the null forming direction $v_c$, the width in the v-axis direction of the null beam in which a gain of the null beam is equal to or smaller than a threshold Th coincides with the null width in the v-axis direction of the null beam.

Figure 7:
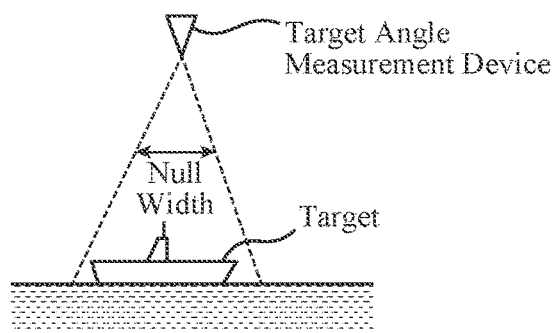
FIG. 7 is an explanatory diagram illustrating a relationship between the null width of the null beam and a target.

FIG. 7 is an explanatory diagram illustrating a relationship between the null width of the null beam and the target.

FIG. 7 illustrates an example in which the null widths in the u-axis direction and the v-axis direction of the null beam are wider than the widths in the u-axis direction and the v-axis direction of the target, so that the gains in the null forming directions $u_c$ and $v_c$ of the null beam are equal to or smaller than the threshold Th.

The correlation matrix $R_{xx}$ of the reflected wave having the angle width is expressed by the following Expression (7).

$$R_{xx} = P_d \int_{u_c+\Delta u_{min}}^{u_c+\Delta u_{max}} \int_{v_c+\Delta v_{min}}^{v_c+\Delta v_{max}} \rho(u,v) a(u,v) a(u,v)^H dv du + \beta I \quad (7)$$

In Expression (7), $P_d$ represents power of the reflected wave received by the reception antenna element 2-m. Herein, $\Delta u_{max}$ represents a constant indicating a maximum angle of the null beam in the u-axis direction, and $\Delta u_{min}$ represents a constant indicating a minimum angle of the null beam in the u-axis direction. Furthermore, $\Delta v_{max}$ represents a constant indicating a maximum angle of the null beam in the v-axis direction, and $\Delta v_{min}$ represents a constant indicating a minimum angle of the null beam in the v-axis direction.

Herein, ρ(u,v) represents a spatial distribution of desired wave power, β represents pseudo noise, and I represents a unit matrix.

By substituting the inverse matrix of the correlation matrix $R_{xx}$ expressed by Expression (7) into Expression (5), a weight $w(\theta_{Beam}, \varphi_{Beam}, \theta_{NULL}, \varphi_{NULL})$ capable of forming the null beam having the null in the null forming directions $u_c$ and $v_c$ can be calculated. Herein, $\theta_{Beam}$ represents a center direction of the beam forming direction $u_d$, and $\varphi_{Beam}$ represents a center direction of the beam forming direction $v_d$. Furthermore, $\theta_{NULL}$ represents the null forming direction $u_c$, and $\varphi_{NULL}$ represents the null forming direction $v_c$.

The null width can be changed by changing each value of $\Delta u_{max}$, $\Delta u_{min}$, $\Delta v_{max}$, and $\Delta v_{min}$.

Hereinafter, it is supposed that the null is formed in an angular range of $u_c \pm \Delta u/2$, and the null is formed in an angular range of $v_c \pm \Delta v/2$, where $\Delta u = \Delta u_{max} - \Delta u_{min}$, and $\Delta v = \Delta v_{max} - \Delta v_{min}$.

When receiving the digital signal from the A/D converter 3-m, the coherent integrating unit 6-m (m=1, . . . , M) performs coherent integration on the digital signal by performing, for example, FFT on the digital signal in the time direction (step ST1 in FIG. 4).

The coherent integrating unit 6-m outputs the signal after the coherent integration to the pulse compressing unit 7-m.

When receiving the signal after the coherent integration from the coherent integrating unit 6-m, the pulse compressing unit 7-m performs pulse compression on the signal after the coherent integration in order to suppress an unnecessary wave received by the reception antenna element 2-m (step ST2 in FIG. 4).

The pulse compressing unit 7-m outputs a signal $r_{APC,m}(t)$ after the pulse compression to the DBF unit 8.

The table 8a of the DBF unit 8 stores the weight $w(\theta_{Beam}, \varphi_{Beam}, \theta_{NULL}, \varphi_{NULL})$ calculated by substituting the inverse matrix of the correlation matrix $R_{xx}$ in Expression (7) into Expression (5).

That is, the table 8a stores a plurality of weights $w(\theta_{Beam}, \varphi_{Beam}, \theta_{NULL}, \varphi_{NULL})$ in which at least one of the null width $u_c \pm \Delta u/2$ in the u-axis direction and the null width $v_c \pm \Delta v/2$ in the v-axis direction is different for each of the null forming directions $u_c$ and $v_c$.

Each of the DBF unit 8 and the angle width estimating unit 9 repeatedly performs the following processing a plurality of times. The following processing can be repeated a plurality of times as long as one reception array signal $r_{ARE}(t)$ is acquired.

Here, for convenience of description, an example of changing the null width $u_c \pm \Delta u/2$ in the u-axis direction is described supposing that the null width $v_c \pm \Delta v/2$ in the v-axis direction is constant. It is supposed that the null width in the v-axis direction is sufficiently wider than the width in the v-axis direction of the target. Further, it is supposed that the null forming directions $u_c$ and $v_c$ are constant.

[First Processing]

The DBF unit 8 acquires a weight $w_1(\theta_{Beam}, \varphi_{Beam}, \theta_{NULL}, \varphi_{NULL})$ for forming the null with the null width of 0 in the u-axis direction or the null with a narrow null width in the u-axis direction from the table 8a. The null with the narrow null width is the null with the null width close to 0.

The DBF unit 8 multiplies the signal $r_{APC,m}(t)$ after the pulse compression output from the pulse compressing unit 7-m, by a weight element $w_{1,m}$ corresponding to the m-th pulse compressing unit 7-m out of M weight elements $w_{1,1}$ to $w_{1,M}$ included in the weight $w_1(\theta_{Beam}, \varphi_{Beam}, \theta_{NULL}, \varphi_{NULL})$.

The DBF unit 8 forms a null beam $B_{NULL,1}$ by calculating the sum $\Sigma r_{APC,m}(t) \times w_{1,m}$ of the M multiplication results (step ST3 in FIG. 4).

The DBF unit 8 outputs the null beam $B_{NULL,1}$ to the angle width estimating unit 9.

When acquiring the null beam $B_{NULL,1}$ from the DBF unit 8, the angle width estimating unit 9 calculates power $P_1(\theta_{Beam}, \varphi_{Beam}, \theta_{NULL}, \varphi_{NULL})$ of the null beam $B_{NULL,1}$, as expressed by the following Expression (8) (step ST4 in FIG. 4).

$$P_1(\theta_{Beam}, \varphi_{Beam}, \theta_{Null}, \varphi_{null}) = |w_1(\theta_{Beam}, \varphi_{Beam}, \theta_{Null}, \varphi_{null})^H r_{APC}(t)|^2 \quad (8)$$

The angle width estimating unit 9 stores the power $P_1(\theta_{Beam}, \varphi_{Beam}, \theta_{NULL}, \varphi_{NULL})$ of the null beam $B_{NULL,1}$ in an internal memory.

[j-th Processing] (j=2, . . . , J)

When acquiring the null beam forming command from the angle width estimating unit 9, the DBF unit 8 acquires a weight $w_j(\theta_{Beam}, \varphi_{Beam}, \theta_{NULL}, \varphi_{NULL})$ for forming the null with a wider null width in the u-axis direction than that in (j−1)-th processing from the table 8a.

The DBF unit 8 multiplies the signal $r_{APC,m}(t)$ after the pulse compression output from the pulse compressing unit 7-m, by a weight element $w_{j,m}$ corresponding to the m-th pulse compressing unit 7-m out of the M weight elements $w_{j,1}$ to $w_{j,M}$ included in the weight $w_1(\theta_{Beam}, \varphi_{Beam}, \theta_{NULL}, \varphi_{NULL})$.

The DBF unit 8 forms a null beam $B_{NULL,j}$ by calculating the sum $\Sigma r_{APC,m}(t) \times w_{j,m}$ of M multiplication results (step ST3 in FIG. 4).

The DBF unit 8 outputs the null beam $B_{NULL,j}$ to the angle width estimating unit 9.

When acquiring the null beam $B_{NULL,j}$ from the DBF unit 8, the angle width estimating unit 9 calculates power $P_j(\theta_{Beam}, \varphi_{Beam}, \theta_{NULL}, \varphi_{NULL})$ of the null beam $B_{NULL,j}$, as expressed by the following Expression (9) (step ST4 in FIG. 4).

$$P_j(\theta_{Beam}, \varphi_{Beam}, \theta_{Null}, \varphi_{null}) = |w_j(\theta_{Beam}, \varphi_{Beam}, \theta_{Null}, \varphi_{null})^H r_{APC}(t)|^2 \quad (9)$$

The angle width estimating unit 9 stores the power $P_j(\theta_{Beam}, \varphi_{Beam}, \theta_{NULL}, \varphi_{NULL})$ of the null beam $B_{NULL,j}$ in the internal memory.

Each of the DBF unit 8 and the angle width estimating unit 9 repeatedly performs the j-th processing until the power $P_j(\theta_{Beam}, \varphi_{Beam}, \theta_{NULL}, \varphi_{NULL})$ of the null beam $B_{NULL,j}$ stops decreasing even when the null width in the u-axis direction is widened.

Figure 8:
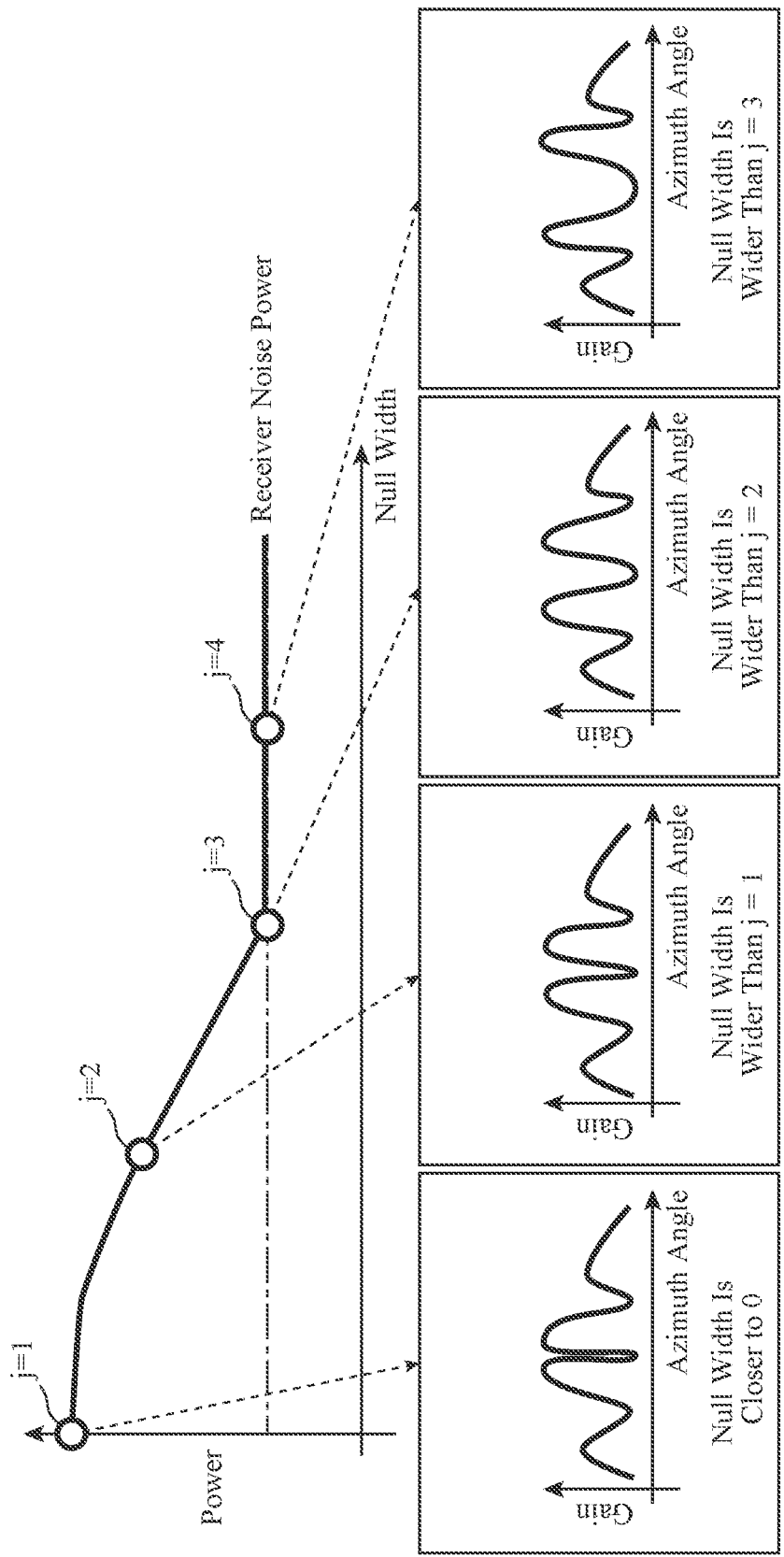
FIG. 8 is an explanatory diagram illustrating a relationship between the null width of the null beam and power of the null beam.

FIG. 8 is an explanatory diagram illustrating a relationship between the null width of the null beam and the power of the null beam.

As the null width is narrower, the radio waves reflected by the target increase, so that the power of the null beam increases. In contrast, when the null width becomes wider, the radio waves reflected by the target decrease, so that the power of the null beam decreases. Note that, for example, when the null width of the null beam is wider than the width of the target as illustrated in FIG. 7, even when the null width becomes further wider, the radio wave reflected by the target does not change, so that the power of the null beam does not decrease. That is, the power of the null beam is not smaller than known receiver noise power.

In the example in FIG. 8, the processing is performed four times, and the power $P_j(\theta_{Beam}, \varphi_{Beam}, \theta_{NULL}, \varphi_{NULL})$ stops decreasing in the third processing.

Therefore, in the example in FIG. 8, the null width in the third processing indicates the angle width of the reflected wave.

The angle width estimating unit 9 compares J pieces of power $P_1(\theta_{Beam}, \varphi_{Beam}, \theta_{NULL}, \varphi_{NULL})$ to $P_J(\theta_{Beam}, \varphi_{Beam}, \theta_{NULL}, \varphi_{NULL})$ stored in the internal memory with one another.

The angle width estimating unit 9 searches for a null width $B_\theta$ in the u-axis direction when the power $P_j(\theta_{Beam}, \varphi_{Beam}, \theta_{NULL}, \varphi_{NULL})$ stops decreasing from a state in which the power $P_j(\theta_{Beam}, \varphi_{Beam}, \theta_{NULL}, \varphi_{NULL})$ decreases, on the basis of a comparison result of the powers (step ST5 in FIG. 4).

Heretofore, the DBF unit 8 changes the null width $u_c \pm \Delta u/2$ in the u-axis direction supposing that the null width $v_c \pm \Delta v/2$ in the v-axis direction is constant.

Next, the DBF unit 8 changes the null width $v_c \pm \Delta v/2$ in the v-axis direction supposing that the null width $u_c \pm \Delta u/2$ in the u-axis direction is constant. It is supposed that the null width in the u-axis direction is sufficiently wider than the width in the u-axis direction of the target. Further, it is supposed that the null forming directions $u_c$ and $v_c$ are constant.

Each of the DBF unit 8 and the angle width estimating unit 9 searches for a null width $B_\varphi$ in the v-axis direction by a method similar to that of the processing of searching for the null width $B_\theta$ in the u-axis direction while changing the null width $v_c \pm \Delta v/2$ in the v-axis direction.

The angle width estimating unit 9 outputs, as an angle width $A_\theta$ in the u-axis direction of the reflected wave, the searched null width $B_\theta$ in the u-axis direction to the target angle measuring unit 10, and outputs, as an angle width $A_\varphi$ in the v-axis direction of the reflected wave, the searched null width $B_\varphi$ in the v-axis direction to the target angle measuring unit 10.

The target angle measuring unit 10 measures the angle of the target using the angle widths $A_\theta$ and $A_\varphi$ output from the angle width estimating unit 9.

The target angle measuring unit 10 outputs an angle measurement value of the target to an external display or the like.

Because angle measurement processing of the target by the target angle measuring unit 10 is a known technology, the detailed description thereof is omitted. Hereinafter, an example of the angle measurement processing of the target is briefly described.

The target angle measuring unit 10 acquires a weight $w_j(\theta_{Beam}, \varphi_{Beam}, \theta_{NULL}, \varphi_{NULL})$ corresponding to both the angle width $A_\theta$ in the u-axis direction and the angle width $A_\varphi$ in the v-axis direction from the table 8a of the DBF unit 8.

The target angle measuring unit 10 acquires $\theta_{Beam}$ which is a parameter of the acquired weight $w_j(\theta_{Beam}, \varphi_{Beam}, \theta_{NULL}, \varphi_{NULL})$.

The target angle measuring unit 10 also acquires $\varphi_{Beam}$ which is a parameter of the acquired weight $w_j(\theta_{Beam}, \varphi_{Beam}, \theta_{NULL}, \varphi_{NULL})$.

In the center direction $\theta_{Beam}$ in the beam forming direction $u_d$, the angle measurement value in the u-axis direction of the target is $\theta_{Beam}$, and in the center direction $\varphi_{Beam}$ in the beam forming direction $v_d$, the angle measurement value in the v-axis direction of the target is $\varphi_{Beam}$.

However, since the reflected wave has the angle width $A_\theta$ in the u-axis direction, the angle measurement value in the u-axis direction of the target is not $\theta_{Beam}$ except for the center direction $\theta_{Beam}$ in the beam forming direction $u_d$. Therefore, the target angle measuring unit 10 provides a latitude in the angle measurement value in the u-axis direction of the target, depending on the angle width $A_\theta$ in the u-axis direction of the reflected wave. That is, the target angle measuring unit 10 calculates $\theta_{Beam} \pm A_\theta/2$ as the angle measurement value in the u-axis direction of the target.

Since the reflected wave has the angle width $A_\varphi$ in the v-axis direction, the angle measurement value in the v-axis direction of the target is not $\varphi_{Beam}$ except for the center direction $\varphi_{Beam}$ in the beam forming direction $v_d$. Therefore, the target angle measuring unit 10 provides a latitude in the angle measurement value in the v-axis direction of the target, depending on the angle width $A_\varphi$ in the v-axis direction of the reflected wave. That is, the target angle measuring unit 10 calculates $\varphi_{Beam} \pm A_\varphi/2$ as the angle measurement value in the v-axis direction of the target.

In the first embodiment described above, the angle width estimation device 4 is configured in such a way as to include: the beam forming unit 5 to acquire one reception array signal of the reflected wave from the target to be observed, and form, from the one reception array signal, a plurality of null beams having nulls in the arrival direction of the reflected wave, and having null widths which are widths of the nulls and different from each other; and the angle width estimating unit 9 to compare powers of the plurality of null beams formed by the beam forming unit 5 with each other, and estimate the null width indicating the angle width of the reflected wave on the basis of the comparison result of the powers. Therefore, the angle width estimation device 4 can estimate the angle width of the reflected wave from the target from the one reception array signal.

In the angle width estimation device 4 illustrated in FIG. 1, the DBF unit 8 forms the null beam $B_{NULL,j}$ (j=1, . . . , J), using the weight $w_j(\theta_{Beam}, \varphi_{Beam}, \theta_{NULL}, \varphi_{NULL})$ calculated by substituting the inverse matrix of the correlation matrix $R_{xx}$ in Expression (7) into Expression (5). However, this is merely an example, and the DBF unit 8 may form the null beam $B_{NULL,j}$ (j=1, . . . , J), by using the weight $w_j(\theta_{Beam}, \varphi_{Beam}, \theta_{NULL}, \varphi_{NULL})$ calculated by substituting an inverse matrix of a correlation matrix $R_{xx}$ expressed by the following Expression (10) into Expression (5) in place of the correlation matrix $R_{xx}$ expressed by Expression (7).

The correlation matrix $R_{xx}$ expressed by Expression (10) is calculated, by acquiring an Hadamard product of a correlation matrix $R_{xx}'$ of the reflected wave having no angle width expressed by the following Expression (11) and a covariance matrix taper (CMT) matrix T. The correlation matrix $R_{xx}$ expressed by Expression (10) is the correlation matrix $R_{xx}$ of the reflected wave having the angle width, and is acquired without numerical integration.

$$R_{xx} = T \odot R_{xx}' \quad (10)$$

$$= T \odot \left(a(u_c, v_c)a(u_c, v_c)^H + \beta I\right)$$

$$R_{xx}' = \left(a(u_c, v_c)a(u_c, v_c)^H + \beta I\right) \quad (11)$$

In Expression (10), $\odot$ represents an Hadamard product.

An m,n element $[T]_{m,n}$ of the CMT matrix T is expressed by the following Expression (12).

$$[T]_{m,n} = \frac{\sin\left(\frac{\pi}{\lambda}\Delta x_{m,n}\Delta u\right)}{\left(\frac{\pi}{\lambda}\Delta x_{m,n}\Delta u\right)} \cdot \frac{\sin\left(\frac{\pi}{\lambda}\Delta y_{m,n}\Delta v\right)}{\left(\frac{\pi}{\lambda}\Delta y_{m,n}\Delta v\right)} \quad (12)$$

In Expression (12), $\Delta x_{m,n} = x_m - x_n$ and $\Delta y_{m,n} = y_m - y_n$ are satisfied.

In the angle width estimation device 4 illustrated in FIG. 1, the DBF unit 8 forms null beams $B_{NULL,j}$ (j=1, . . . , J) in order from a null beam with a narrow null width. Then, the angle width estimating unit 9 monitors a change in power of the null beam $B_{NULL,j}$ output from the beam forming unit 5, and searches for, as the null width indicating the angle width, the null width of the null beam when the power stops decreasing from the state in which the power decreases. However, this is merely an example, and the DBF unit 8 forms the null beams $B_{NULL,j}$ (j=1, . . . , J) in order from a null beam with a wider null width. Then, the angle width estimating unit 9 may monitor a change in power of the null beam $B_{NULL,j}$ output from the DBF unit 8, and search for, as the null width indicating the angle width, the null width of the null beam immediately before the power starts increasing from a state in which there is no change in the power. In this case also, in the example in FIG. 8, the null width in the third processing indicates the angle width of the reflected wave.

Second Embodiment

In a second embodiment, an angle width estimation device 4 in which a DBF unit 12 of a beam forming unit 11 forms a beam at an end of a null beam $B_{NULL,j}$ (j=1, . . . , J) is described.

Figure 9:
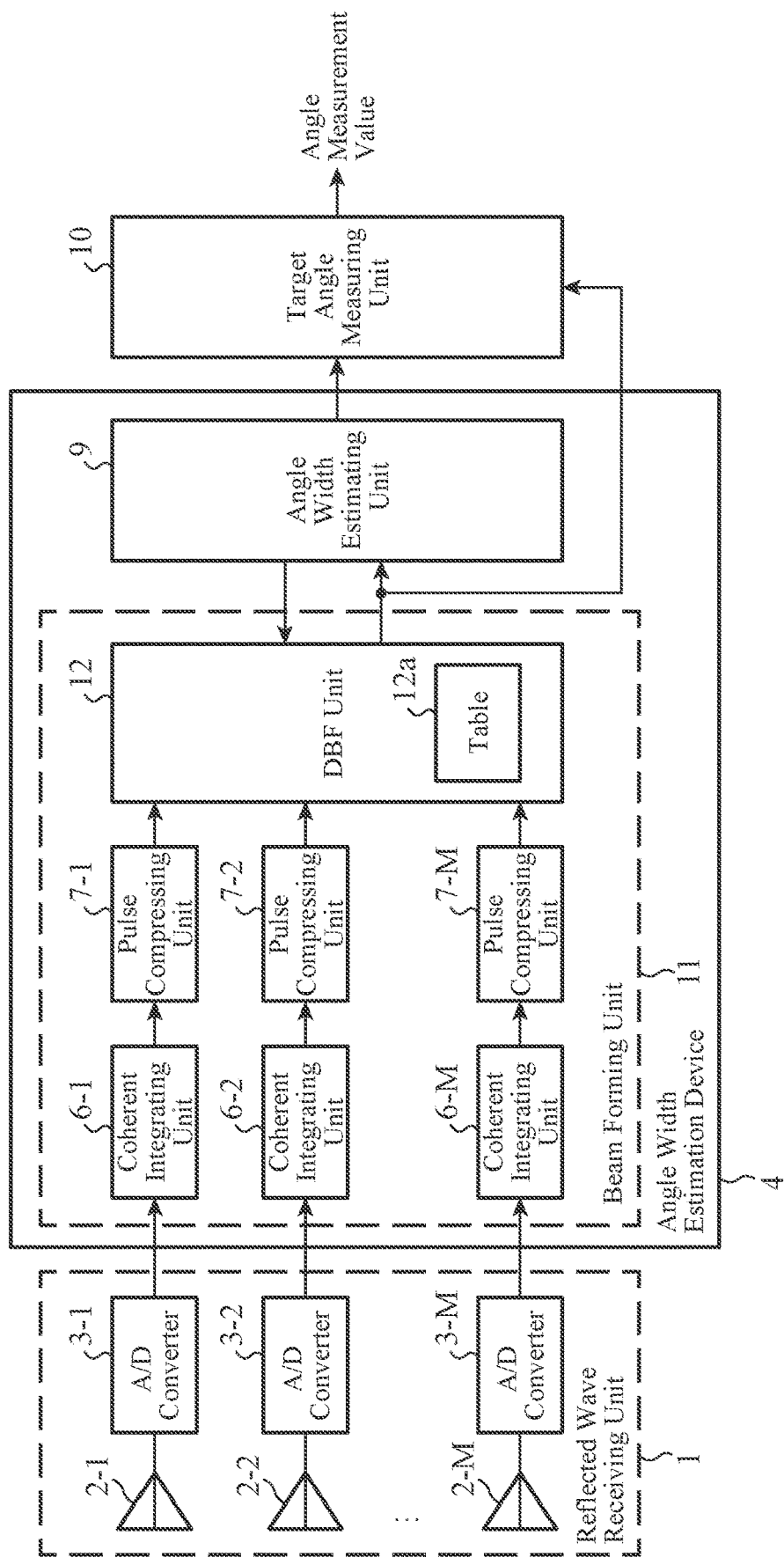
FIG. 9 is a configuration diagram illustrating a target angle measurement device including an angle width estimation device 4 according to a second embodiment.

FIG. 9 is a configuration diagram illustrating a target angle measurement device including the angle width estimation device 4 according to the second embodiment. In FIG. 9, the same reference sign as that in FIG. 1 represents the same or corresponding portion, so that the description thereof is omitted.

Figure 10:
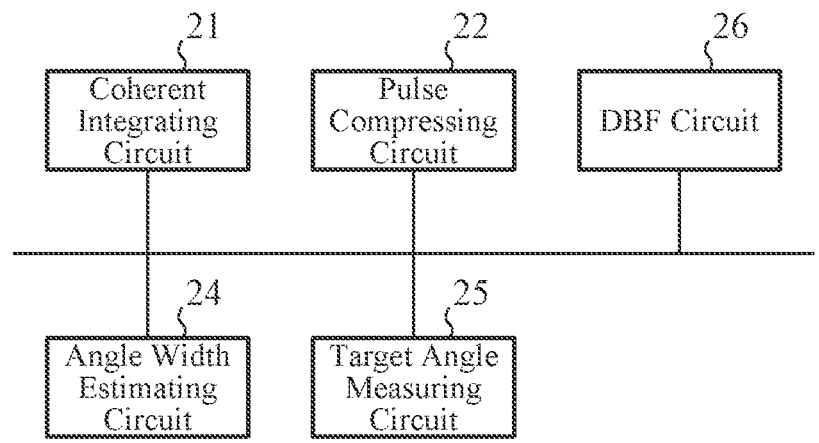
FIG. 10 is a hardware configuration diagram illustrating hardware of a digital signal processing unit in the target angle measurement device illustrated in FIG. 9.

FIG. 10 is a hardware configuration diagram illustrating hardware of a digital signal processing unit in the target angle measurement device illustrated in FIG. 9. In FIG. 10, the same reference sign as that in FIG. 2 represents the same or corresponding portion, so that the description thereof is omitted.

The beam forming unit 11 is provided with coherent integrating units 6-1 to 6-M, pulse compressing units 7-1 to 7-M, and the DBF unit 12.

The beam forming unit 11 forms, from one reception array signal $r_{ARE}$ output from a reflected wave receiving unit 1, a plurality of null beams having nulls in an arrival direction of a reflected wave, and having null widths different from each other, as is the case of the beam forming unit 5 illustrated in FIG. 1.

The beam forming unit 11 forms a beam at an end of each null beam.

The DBF unit 12 is implemented by a DBF circuit 26 illustrated in FIG. 10, for example.

The DBF unit 12 is provided with a table 12a.

The table 12a stores a plurality of weights regarding the null beam formed by the DBF unit 12 as is the case of the table 8a illustrated in FIG. 1. Note that, a weight w stored in the table 12a is different from the weight w stored in the table 8a, and is the weight capable of forming a beam at an end in a u-axis direction of the null beam $B_{NULL,j}$ (j=1, . . . , J) and forming a beam at an end in a v-axis direction of the null beam $B_{NULL,j}$.

The DBF unit 12 forms the null beam $B_{NULL,j}$ having the beam at the end, by performing digital beam forming on a plurality of signals after pulse compression output from the pulse compressing units 7-1 to 7-M.

In FIG. 9, it is supposed that each of the coherent integrating units 6-1 to 6-M, the pulse compressing units 7-1 to 7-M, the DBF unit 12, and the angle width estimating unit 9, which are components of the angle width estimation device 4, is implemented by dedicated hardware as illustrated in FIG. 10. That is, it is supposed that the angle width estimation device 4 is implemented by a coherent integrating circuit 21, a pulse compressing circuit 22, the DBF circuit 26, and an angle width estimating circuit 24.

Each of the coherent integrating circuit 21, the pulse compressing circuit 22, the DBF circuit 26, and the angle width estimating circuit 24 corresponds to, for example, a single circuit, a composite circuit, a programmed processor, a parallel-programmed processor, an ASIC, a FPGA, or a combination thereof.

The components of the angle width estimation device 4 are not limited to those implemented by the dedicated hardware, and the angle width estimation device 4 may also be implemented by software, firmware, or a combination of the software and firmware.

When the angle width estimation device 4 is implemented by the software, firmware or the like, a program for causing a computer to execute each processing procedure in the coherent integrating units 6-1 to 6-M, the pulse compressing units 7-1 to 7-M, the DBF unit 12, and the angle width estimating unit 9 is stored in a memory 31 illustrated in FIG. 3. Then, a processor 32 illustrated in FIG. 3 executes the program stored in the memory 31.

Next, an operation of the target angle measurement device illustrated in FIG. 9 is described. Note that, since components other than the DBF unit 12 are similar to those of the target angle measurement device illustrated in FIG. 1, only an operation of the DBF unit 12 is herein described.

In the target angle measurement device illustrated in FIG. 1, the DBF unit 8 forms the null beam $B_{NULL,j}$ (j=1, . . . , J) having the null in the arrival direction of the reflected wave. However, there is no guarantee that the null width of the null beam $B_{NULL,j}$ formed by the DBF unit 8 coincides with the angle width of the reflected wave. Therefore, there is a possibility that the null beam $B_{NULL,j}$ having the null with the null width wider than the angle width of the reflected wave is formed by first processing by the DBF unit 8. In this case, even when the DBF unit 8 forms the null beam $B_{NULL,j}$ having the null with a wider null width in j-th processing than that in (j−1)-th processing, null widths $B_\theta$ and $B_\varphi$ cannot be searched for in some cases.

In the target angle measurement device illustrated in FIG. 9, in order to prevent the null width of the null beam $B_{NULL,j}$ from being widened more than necessary, the DBF unit 12 forms the beam $B_{NULL,j}$ having the beam at the end.

The DBF unit 12 acquires a weight w calculated by the following Expression (13) from the table 12a and forms the null beam $B_{NULL,j}$ using the weight w.

$$w = R^{-1}C(C^H R^{-1} C)^{-1} H \tag{13}$$

$$H = [1, 1, 1, 1]^T \tag{14}$$

$$C = \left[ a\left(u_c - \frac{\Delta u}{2}, v_c\right), a\left(u_c + \frac{\Delta u}{2}, v_c\right), a\left(u_c, v_c - \frac{\Delta v}{2}\right), a\left(u_c, v_c + \frac{\Delta v}{2}\right) \right] \tag{15}$$

In Expressions (13) to (15), C represents a constraint matrix, and H represents a constraint response value for the constraint matrix C.

Figure 11:
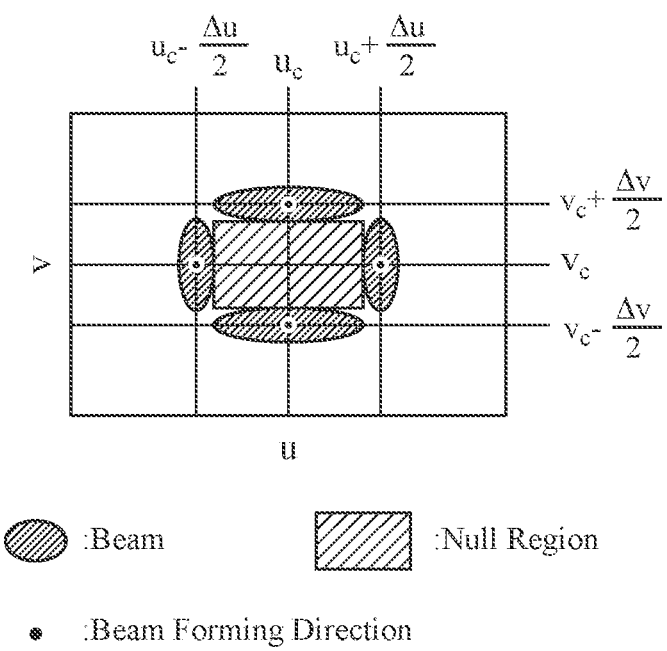
FIG. 11 is an explanatory diagram illustrating a null beam formed by a DBF unit 12.

FIG. 11 is an explanatory diagram illustrating a null beam formed by the DBF unit 12.

In the example in FIG. 11, the null beam $B_{NULL,j}$ is formed in null forming directions $u_c$ and $v_c$. A hatched region is a null region, the null width in the u-axis direction is $(u_c+\Delta u/2)-(u_c-\Delta u/2)$, and the null width in the v-axis direction is $(v_c+\Delta v/2)-(v_c-\Delta v/2)$.

In the example in FIG. 11, beams are formed at ends in the u-axis direction of the null beam $B_{NULL,j}$, and beams are formed at ends in the v-axis direction of the null beam $B_{NULL,j}$.

That is, the beams a longitudinal direction each of which is a direction parallel to the v-axis are formed at $u_c \pm \Delta u/2$, and the beams a longitudinal direction each of which are a direction parallel to the u-axis is formed at $v_c \pm \Delta v/2$.

Since the DBF unit 12 is constrained to form the beam at the end, the null width of the null beam $B_{NULL,j}$ formed by the DBF unit 12 is likely to be narrower than the null width of the null beam $B_{NULL,j}$ formed by the DBF unit 8 illustrated in FIG. 1.

Therefore, the target angle measurement device illustrated in FIG. 9 is more likely to be able to search for the null widths $B_\theta$ and $B_\varphi$ than the target angle measurement device illustrated in FIG. 1.

Third Embodiment

In a third embodiment, an angle width estimation device 4 in which a DBF unit 14 of a beam forming unit 13 rotates a forming direction of a null beam $B_{NULL,j}$ (j=1, . . . , J) is described.

Figure 12:
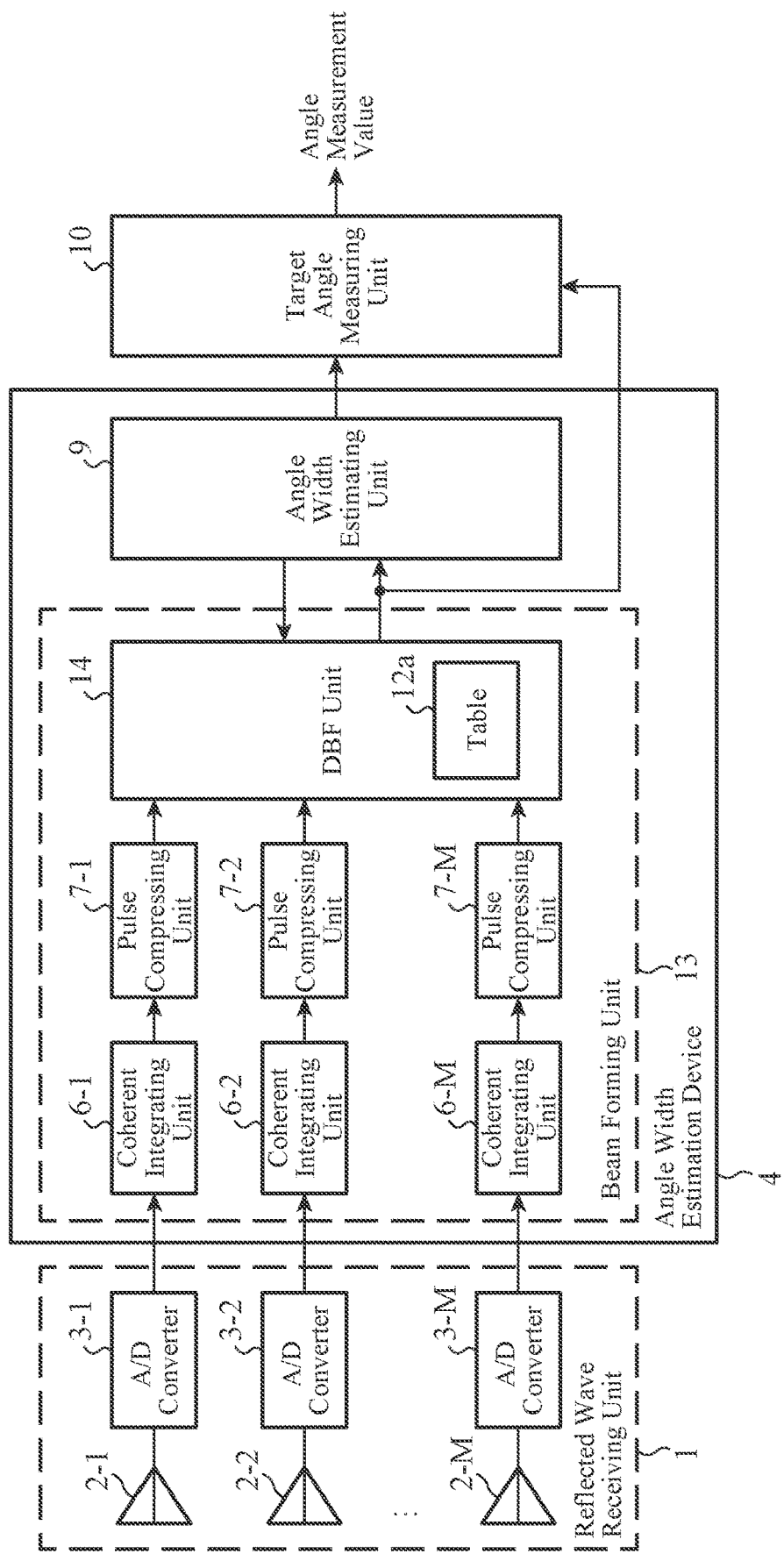
FIG. 12 is a configuration diagram illustrating a target angle measurement device including an angle width estimation device 4 according to a third embodiment.

FIG. 12 is a configuration diagram illustrating a target angle measurement device including the angle width estimation device 4 according to the third embodiment. In FIG. 12, the same reference sign as that in FIGS. 1 and 9 represents the same or corresponding part, so that the description thereof is omitted.

Figure 13:
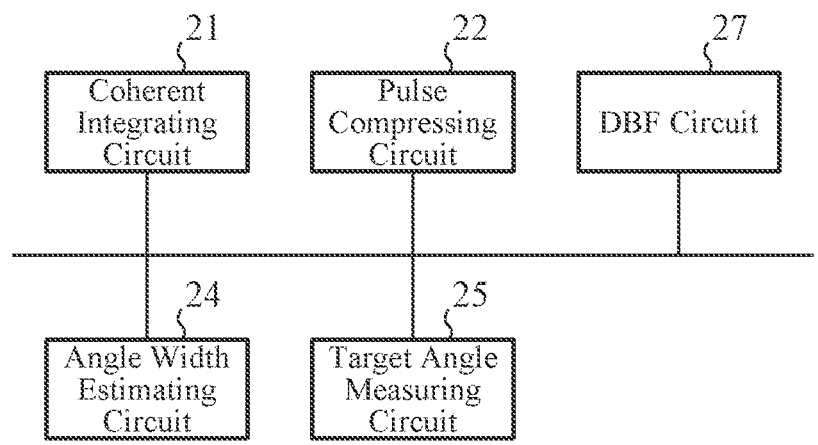
FIG. 13 is a hardware configuration diagram illustrating hardware of a digital signal processing unit in the target angle measurement device illustrated in FIG. 12.

FIG. 13 is a hardware configuration diagram illustrating hardware of a digital signal processing unit in the target angle measurement device illustrated in FIG. 12. In FIG. 13, the same reference sign as that in FIGS. 2 and 10 represents the same or corresponding part, so that the description thereof is omitted.

The beam forming unit 13 is provided with coherent integrating units 6-1 to 6-M, pulse compressing units 7-1 to 7-M, and the DBF unit 14.

The beam forming unit 13 forms, from one reception array signal $r_{ARE}$ output from a reflected wave receiving unit 1, a plurality of null beams having nulls in an arrival direction of a reflected wave, and having null widths different from each other, as is the case of the beam forming unit 5 illustrated in FIG. 1.

The beam forming unit 13 rotates the forming direction of each null beam.

The DBF unit 14 is implemented by a DBF circuit 27 illustrated in FIG. 13, for example.

The DBF unit 14 is provided with a table 12a as is the case of the DBF unit 12 illustrated in FIG. 9.

In the target angle measurement device illustrated in FIG. 12, the DBF unit 14 is provided with the table 12a. However, this is merely an example, and the DBF unit 14 may be provided with the table 8a as is the case with the DBF unit 8 illustrated in FIG. 1.

The DBF unit 14 forms the null beam $B_{NULL,j}$ (j=1, . . . , J) by performing digital beam forming on a plurality of signals after pulse compression output from the pulse compressing units 7-1 to 7-M, as is the case with the DBF unit 8 illustrated in FIG. 1 or the DBF unit 12 illustrated in FIG. 9.

Unlike the DBF unit 8 and the like illustrated in FIG. 1, the DBF unit 14 rotates the forming direction of the null beam $B_{NULL,j}$.

In FIG. 12, it is supposed that each of the coherent integrating units 6-1 to 6-M, the pulse compressing units 7-1 to 7-M, the DBF unit 14, and the angle width estimating unit 9, which are components of the angle width estimation device 4, is implemented by dedicated hardware as illustrated in FIG. 13. That is, it is supposed that the angle width estimation device 4 is implemented by a coherent integrating circuit 21, a pulse compressing circuit 22, the DBF circuit 27, and an angle width estimating circuit 24.

Each of the coherent integrating circuit 21, the pulse compressing circuit 22, the DBF circuit 27, and the angle width estimating circuit 24 corresponds to, for example, a single circuit, a composite circuit, a programmed processor, a parallel-programmed processor, an ASIC, a FPGA, or a combination thereof.

The components of the angle width estimation device 4 are not limited to those implemented by the dedicated hardware, and the angle width estimation device 4 may also be implemented by software, firmware, or a combination of the software and firmware.

When the angle width estimation device 4 is implemented by the software, firmware or the like, a program for causing a computer to execute each processing procedure in the coherent integrating units 6-1 to 6-M, the pulse compressing units 7-1 to 7-M, the DBF unit 14, and the angle width estimating unit 9 is stored in a memory 31 illustrated in FIG. 3. Then, a processor 32 illustrated in FIG. 3 executes the program stored in the memory 31.

Next, an operation of the target angle measurement device illustrated in FIG. 12 is described. Note that, since components other than the DBF unit 14 are similar to those of the target angle measurement device illustrated in each of FIGS. 1 and 9, only an operation of the DBF unit 14 is herein described.

The DBF unit 14 forms the null beam $B_{NULL,j}$ by a method similar to that of the DBF unit 8 illustrated in FIG. 1 or the DBF unit 12 illustrated in FIG. 9.

As expressed by the following Expression (17), the DBF unit 14 rotates the forming direction of the null beam $B_{NULL,j}$, by multiplying an element coordinate matrix R expressed by Expression (3) by a rotation matrix $R_{rot}(\theta_{rot})$ corresponding to a rotation angle $\theta_{rot}$ expressed by Expression (16). The DBF unit 14 can rotate the forming direction of the null beam $B_{NULL,j}$ by a desired angle by appropriately adjusting the rotation angle $\theta_{rot}$.

$$R_{rot}(\theta_{rot}) = \begin{bmatrix} \cos\theta_{rot} & -\sin\theta_{rot} \\ \sin\theta_{rot} & \cos\theta_{rot} \end{bmatrix} \tag{16}$$

$$R_r = R_{rot}(\theta_{rot})R = \begin{bmatrix} x_{r1} & y_{r1} \\ x_{r2} & y_{r2} \\ \vdots & \vdots \\ x_{rM} & y_{rM} \end{bmatrix} \tag{17}$$

In Expression (17), $R_r$ represents the element coordinate matrix after coordinate rotation.

Figure 14:
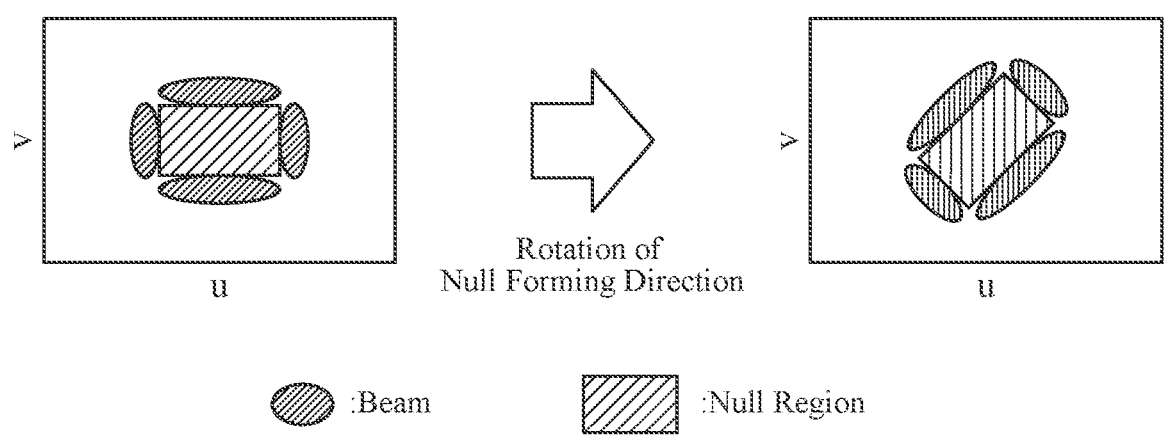
FIG. 14 is an explanatory diagram illustrating rotation of a forming direction of the null beam.

FIG. 14 is an explanatory diagram illustrating the rotation of the forming direction of the null beam.

In FIG. 14, a hatched region is a null region.

In an example in FIG. 14, beams are formed at ends in a u-axis direction of the null beam, and beams are formed at ends in a v-axis direction of the null beam. However, this is merely an example, and the null beam may also be that without the beams formed at the ends in the u-axis direction of the null beam and without the beams formed at the ends in the v-axis direction of the null beam.

The DBF unit 14 can control null forming directions $u_c$ and $v_c$, by calculating a CMT matrix T expressed by the following Expression (18) using the element coordinate matrix $R_r$ after coordinate rotation.

The DBF unit 14 can also control a null expanding direction, by calculating the CMT matrix T expressed by the following Expression (18) using the element coordinate matrix $R_r$ after coordinate rotation.

$$[T]_{m,n} = \frac{\sin\left(\frac{\pi}{\lambda}\Delta x^r_{m,n}\Delta u\right)}{\left(\frac{\pi}{\lambda}\Delta x^r_{m,n}\Delta u\right)} \cdot \frac{\sin\left(\frac{\pi}{\lambda}\Delta y^r_{m,n}\Delta v\right)}{\left(\frac{\pi}{\lambda}\Delta y^r_{m,n}\Delta v\right)} \tag{18}$$

In Expression (18), $\Delta x^r_{m,n}=x_{rm}-x_{rn}$ and $\Delta y^r_{m,n}=y_{rm}-y_{rn}$ are satisfied.

In the third embodiment described above, the angle width estimation device 4 illustrated in FIG. 12 is configured in such a manner that the beam forming unit 13 rotates the forming direction of the null beam. Therefore, as is the case of the angle width estimation device 4 illustrated in FIG. 1, the angle width estimation device 4 illustrated in FIG. 12 can estimate the angle width of the reflected wave from the target from one reception array signal, and can form the null beam suitable for a shape of the target, a posture of the target or the like.

Note that, in the present disclosure, the embodiments can be freely combined, any component of each embodiment can be modified, or any component can be omitted in each embodiment.

INDUSTRIAL APPLICABILITY

The present disclosure is suitable for an angle width estimation device, an angle width estimation method, and a target angle measurement device.

REFERENCE SIGNS LIST

1: reflected wave receiving unit, 2-1 to 2-M: reception antenna element, 3-1 to 3-M: A/D converter, 4: angle width estimation device, 5, 11, 13: beam forming unit, 6-1 to 6-M: coherent integrating unit, 7-1 to 7-M: pulse compressing unit, 8, 12, 14: DBF unit, 8a, 12a: table, 9: angle width estimating unit, 10: target angle measuring unit, 21: coherent integrating circuit, 22: pulse compressing circuit, 23, 26, 27: DBF circuit, 24: angle width estimating circuit, 25: target angle measuring circuit, 31: memory, 32: processor

The invention claimed is:

1. An angle width estimation device comprising:
a first circuitry for beam forming to acquire one reception array signal of a reflected wave from a target to be observed, and form, from the one reception array signal, a plurality of null beams having nulls in a direction aligned with an arrival direction from which the reflected wave is received, and having null widths which are widths of the nulls and different from each other; and
a second circuitry for angle width estimation to compare powers of the plurality of null beams formed by the beam forming circuitry with each other, and search for a null width which indicates an angle width of the reflected wave on a basis of a comparison result of the powers, wherein
the comparison result of the powers is based on comparing values of powers of the plurality of null beams and values of the corresponding null widths of the plurality of null beams,
the first circuitry forms null beams in order of increasing null width for the plurality of null beams, and outputs the formed null beams to the second circuitry, and
the second circuitry monitors a change in power of the null beams output from the first circuitry, and searches for, as the null width indicating the angle width, a null width of a null beam when power stops decreasing from a state in which the power decreases.

2. The angle width estimation device according to claim 1, wherein
the beam forming circuitry forms null beams in order from a null beam with a wide null width out of the plurality of null beams, and outputs the formed null beams to the angle width estimating circuitry, and
the angle width estimating circuitry monitors a change in power of the null beams output from the beam forming circuitry, and searches for, as the null width indicating the angle width, a null width of a null beam immediately before power starts increasing from a state in which there is no change in the power.

3. The angle width estimation device according to claim 1, wherein the first circuitry forms a beam at an end of each of the null beams.

4. The angle width estimation device according to claim 1, wherein the first circuitry rotates a forming direction of each of the null beams.

5. An angle width estimation method comprising:
acquiring one reception array signal of a reflected wave from a target to be observed, and forming, from the one reception array signal, a plurality of null beams having nulls in a direction aligned with an arrival direction from which the reflected wave is received, and having null widths which are widths of the nulls and different from each other; and
comparing powers of the plurality of null beams formed with each other, and searching for a null width which indicates an angle width of the reflected wave on a basis of a comparison result of the powers, wherein
the comparison result of the powers is based on comparing values of powers of the plurality of null beams and values of the corresponding null widths of the plurality of null beams, and
the angle width estimation method further comprises:
forming null beams in order of increasing null width for the plurality of null beams, and outputting the formed null beams, and
monitoring a change in power of the outputted null beams, and searching for, as the null width indicating the angle width, a null width of a null beam when power stops decreasing from a state in which the power decreases.

* * * * *